(12) United States Patent
Baya Toda et al.

(10) Patent No.: US 10,948,190 B2
(45) Date of Patent: Mar. 16, 2021

(54) COMBUSTION CHAMBER OF A TURBINE, IN PARTICULAR A THERMODYNAMIC CYCLE TURBINE WITH RECUPERATOR, FOR PRODUCING ENERGY, IN PARTICULAR ELECTRICAL ENERGY

(71) Applicant: IFP Energies nouvelles, Rueil-Malmaison (FR)

(72) Inventors: Hubert Baya Toda, Paris (FR); Jean-Baptiste Michel, Rueil Malmaison (FR); Julien Thiriot, Rueil Malmaison (FR); Thomas Valin, Vincennes (FR)

(73) Assignee: IFP Energies nouvelles, Rueil-Malmaison (FR)

( * ) Notice: Subject to any disclaimer, the term of this patent is extended or adjusted under 35 U.S.C. 154(b) by 323 days.

(21) Appl. No.: 15/762,679

(22) PCT Filed: Sep. 13, 2016

(86) PCT No.: PCT/EP2016/071533
§ 371 (c)(1),
(2) Date: Mar. 23, 2018

(87) PCT Pub. No.: WO2017/055074
PCT Pub. Date: Apr. 6, 2017

(65) Prior Publication Data
US 2018/0274786 A1  Sep. 27, 2018

(30) Foreign Application Priority Data
Sep. 30, 2015  (FR) ...................................... 1559314

(51) Int. Cl.
*F23R 3/44*  (2006.01)
*F23R 3/36*  (2006.01)
(Continued)

(52) U.S. Cl.
CPC ................ *F23R 3/44* (2013.01); *F02C 7/22* (2013.01); *F23C 9/006* (2013.01); *F23L 15/04* (2013.01);
(Continued)

(58) Field of Classification Search
CPC .... F23R 3/44; F23R 3/005; F23R 3/06; F23R 3/16; F23R 3/20; F23R 3/26; F23R 3/36; F23L 15/04; F23C 9/006
See application file for complete search history.

(56) References Cited

U.S. PATENT DOCUMENTS 3,754,393 A * 8/1973 Handa ........................ F02C 3/34
                                                          60/750
4,129,985 A * 12/1978 Kajita ......................... F23R 3/02
                                                          60/39.37
(Continued)

FOREIGN PATENT DOCUMENTS

EP         1217297 A1    6/2002
WO    2012/039611 A1    3/2012

OTHER PUBLICATIONS

International Search Report for PCT/EP2016/071533, dated Dec. 13, 2016; English translation submitted herewith (6 pgs.).

*Primary Examiner* — Craig Kim
(74) *Attorney, Agent, or Firm* — Fitch, Even, Tabin & Flannery, LLP

(57) ABSTRACT

A combustion chamber (18) of a thermodynamic cycle turbine with a recuperator, for electrical energy production, comprising a casing (56) housing a flame tube (64) with a perforated diffuser for passage of the hot compressed air, a primary zone (ZP) that receives part of the hot compressed air flow and where combustion takes place, and a dilution zone (ZD) where the burnt gases from the primary zone mix with the remaining part of the hot compressed air flow, said chamber further comprising an injection means (76) for
(Continued)

injecting at least one fuel. The flame tube carries a flame stabilizer (82) comprising perforated diffuser (88), at least one combustion gas recirculation passage (98) and a mixing tube (94).

5 Claims, 2 Drawing Sheets

(51) Int. Cl.
*F23L 15/04* (2006.01)
*F23C 9/00* (2006.01)
*F23R 3/00* (2006.01)
*F23R 3/16* (2006.01)
*F02C 7/22* (2006.01)
*F23R 3/06* (2006.01)
*F23R 3/20* (2006.01)
*F23R 3/26* (2006.01)

(52) U.S. Cl.
CPC ............... *F23R 3/005* (2013.01); *F23R 3/06* (2013.01); *F23R 3/16* (2013.01); *F23R 3/20* (2013.01); *F23R 3/26* (2013.01); *F23R 3/36* (2013.01); *F05D 2220/76* (2013.01); *F05D 2240/35* (2013.01); *F23C 2900/03001* (2013.01); *Y02E 20/34* (2013.01); *Y02T 50/60* (2013.01)

(56) References Cited

U.S. PATENT DOCUMENTS

| | | | | |
|---|---|---|---|---|
| 4,277,942 | A * | 7/1981 | Egnell | F02G 1/055 431/116 |
| 4,389,848 | A * | 6/1983 | Markowski | F23R 3/34 431/352 |
| 4,586,894 | A * | 5/1986 | Wunning | F23C 7/06 431/158 |
| 5,791,148 | A * | 8/1998 | Burrus | F01D 5/18 60/749 |
| 5,802,841 | A * | 9/1998 | Maeda | F23R 3/005 60/784 |
| 5,932,885 | A * | 8/1999 | DeBellis | F23C 3/002 136/253 |
| 8,677,728 | B2 * | 3/2014 | Kovasity | F02C 3/14 60/39.08 |
| 2002/0172905 | A1 | 11/2002 | Ruck et al. | |
| 2004/0018459 | A1 * | 1/2004 | Ruck | F23C 7/002 431/2 |

\* cited by examiner and# COMBUSTION CHAMBER OF A TURBINE, IN PARTICULAR A THERMODYNAMIC CYCLE TURBINE WITH RECUPERATOR, FOR PRODUCING ENERGY, IN PARTICULAR ELECTRICAL ENERGY

CROSS-REFERENCE TO RELATED APPLICATIONS

This application is a U.S. national phase application filed under 35 U.S.C. § 371 of International Application No. PCT/EP2016/071533, filed Sep. 13, 2016, designating the United States, which claims priority from French Patent Application No. 15/59.314, filed Sep. 30, 2015, which are hereby incorporated herein by reference in their entirety.

FIELD OF THE INVENTION

The present invention relates to a combustion chamber of a turbine, notably a thermodynamic cycle turbine with a recuperator, for energy production, notably electrical energy.

It more particularly relates to a microturbine with a recuperator for electricity production from a liquid or gaseous fuel.

Generally, a microturbine is understood to be a low-power turbine, usually below 200 kW.

BACKGROUND OF THE INVENTION

As better described in patent application WO-202/039,611, a turbine with a recuperator generally comprises at least one compression stage with at least one compressor, a combustion chamber (or burner), at least one expansion stage with at least one expansion turbine, a heat exchange device (or recuperator) between the compressor and the burner allowing to heat the gas compressed by the compressor and to send it with a high temperature to the burner, this exchange device being traversed by the hot gases from the turbine.

As described in the aforementioned application, the burner comprises an outer casing through which the hot compressed air from the recuperator flows and a flame tube, arranged outside this casing, within which combustion takes place.

The flame tube comprises a primary zone that receives part of the total hot compressed air flow and wherein combustion takes place, and a dilution zone where mixing of the burnt gas from the primary zone and hot compressed gases coming from dilution holes provided on the tube occurs.

The primary zone further comprises a perforated diffuser allowing passage of the hot compressed air and of the fuel from a (liquid or gaseous) fuel injection system arranged upstream from the diffuser.

Generally, a turbine with a recuperator has a low compression ratio (pressure of the order of 3 to 5 bars) and low temperatures at the turbine inlet in relation to high-power aircraft or stationary gas turbines.

One consequence of these operating characteristics is the overall richness in the combustion chamber, generally less than 0.20, i.e. below the fuel flammability limits.

Furthermore, there is the problem of fuel prevaporization in the case of a liquid fuel.

Generally, the combustion mode allowing low emissions to be obtained is lean premixed combustion.

However, this type of combustion poses significant problems regarding flame stabilization. These problems are compounded by the action of the recuperator, which increases the air temperature at the burner inlet by increasing the risk of flame instability.

Furthermore, the design cost also represents a barrier. Indeed, this type of chamber is characterized by a strong interaction between the flame and the wall, which requires the selection of expensive materials over a large volume and a cooling system for the burner walls generally consisting of multiple holes intended to create an air cushion between the flame and the wall. This cooling system involves a not insignificant extra cost in the manufacturing process, as well as implementation complexity.

All these drawbacks make it difficult to achieve complete combustion and to meet the low emissions requirements in terms of nitrogen oxides (NOx), carbon oxide (CO), unburned hydrocarbons (HC) and particles (PM).

The present invention aims to overcome the aforementioned drawbacks with a low design cost and low-pollution combustion chamber.

SUMMARY OF THE INVENTION

The present invention therefore relates to a combustion chamber of a turbine, notably a thermodynamic cycle turbine with a recuperator, for energy production, notably electrical energy, comprising a casing housing a flame tube with a perforated diffuser for passage of hot compressed air, a primary zone that receives part of the hot compressed air flow and where combustion takes place, and a dilution zone where the burnt gases from the primary zone mix with the remaining part of the hot compressed air flow, said chamber further comprising an injection means for injecting at least one fuel, characterized in that the flame tube carries a flame stabilizer comprising the perforated diffuser, at least one combustion gas recirculation passage and a mixing tube.

The mixing tube of the perforated diffuser can be carried by arms connected to the perforated diffuser while being at a distance from the perforated diffuser.

The mixing tube of the perforated diffuser can be carried by arms connected to the flame tube while being at a distance from the perforated diffuser.

The recirculation passage can be formed between the perforated diffuser and the mixing tube.

The casing can comprise a deflection wall for sending the hot compressed air to the flame tube.

The deflection wall can comprise a semi-toroidal wall with a concavity directed towards the flame tube.

The combustion chamber can comprise a multi-fuel injection means.

The invention also relates to a turbine, notably a thermodynamic cycle turbine with a recuperator, for energy production, in particular electrical energy, comprising at least one compression stage with at least one gas compressor, a heat exchanger, a combustion chamber supplied with fuel by at least one tank, at least one expansion stage with at least one expansion turbine connected by a shaft to the compressor and an energy production means, characterized in that it comprises a combustion chamber as mentioned above.

BRIEF DESCRIPTION OF THE FIGURES

Other features and advantages of the invention will be clear from reading the description hereafter, given by way of non-limitative example, with reference to the accompanying figures wherein.

DETAILED DESCRIPTION OF THE INVENTION

Figure 1:
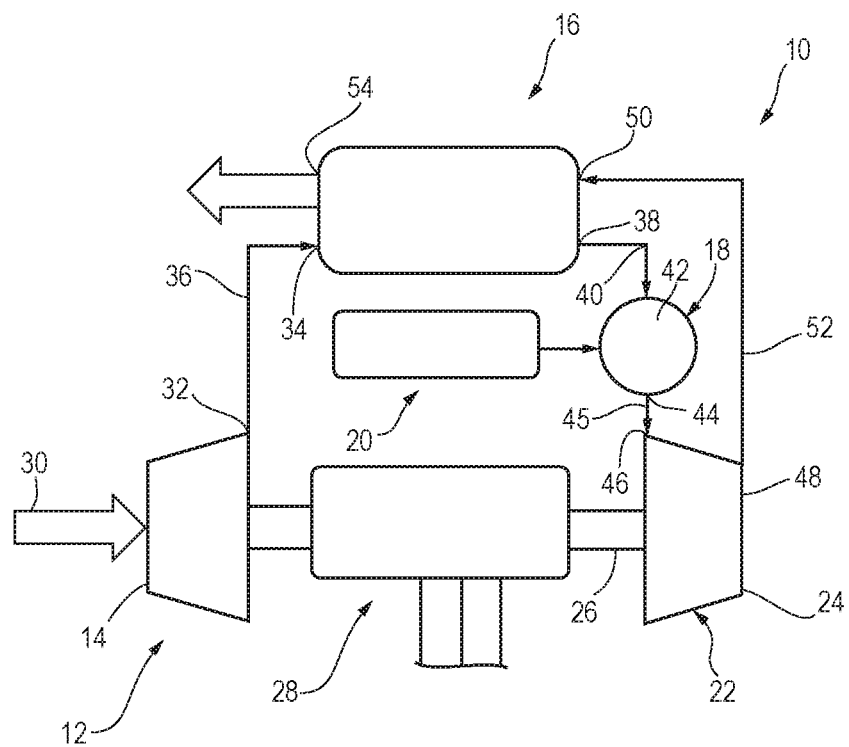
FIG. 1 is a diagram illustrating a turbine with a combustion chamber according to the invention for energy production, notably electrical energy.

In FIG. 1, the illustrated turbine is more particularly a microturbine 10 that operates using at least one fuel such as liquid fuel, of diesel fuel type for example, or a gaseous fuel such as natural gas.

The turbine comprises at least one compression stage 12 with at least one gas compressor 14, a heat exchanger 16 (or recuperator), a combustion chamber 18 (or burner) supplied with fuel by at least one tank 20, at least one expansion stage 22 with at least one expansion turbine 24 connected by a shaft 26 to the compressor. This turbine also comprises an energy production means, electrical energy here, which includes an electric generator 28 advantageously arranged on shaft 26 between the compressor and the turbine.

Of course, this generator can be alternatively connected to the expansion turbine or to the compressor by a shaft other than the one connecting the turbine and the compressor.

Preferably, heat exchanger 16 can be a cross-flow exchanger, of shell-and-tube or alternating plate type with two inlets and two outlets.

Compressor 14 comprises an oxygen-containing fresh air inlet 30, here outside air generally at ambient temperature, and a compressed air outlet 32 leading to a compressed air inlet 34 of exchanger 16 through a line 36. Hot compressed air outlet 38 of this exchanger is connected by a line 40 to a hot compressed air intake 42 of burner 18. Overheated gas outlet 44 of the burner is connected by a line 45 to inlet 46 of the turbine whose outlet 48 is connected to another exchanger inlet 50 by an expanded overheated gas line 52. Exchanger 16 also comprises a cooled gas outlet 54 sending the gas to any discharge and treatment means, such as a chimney (not shown).

Figure 2:
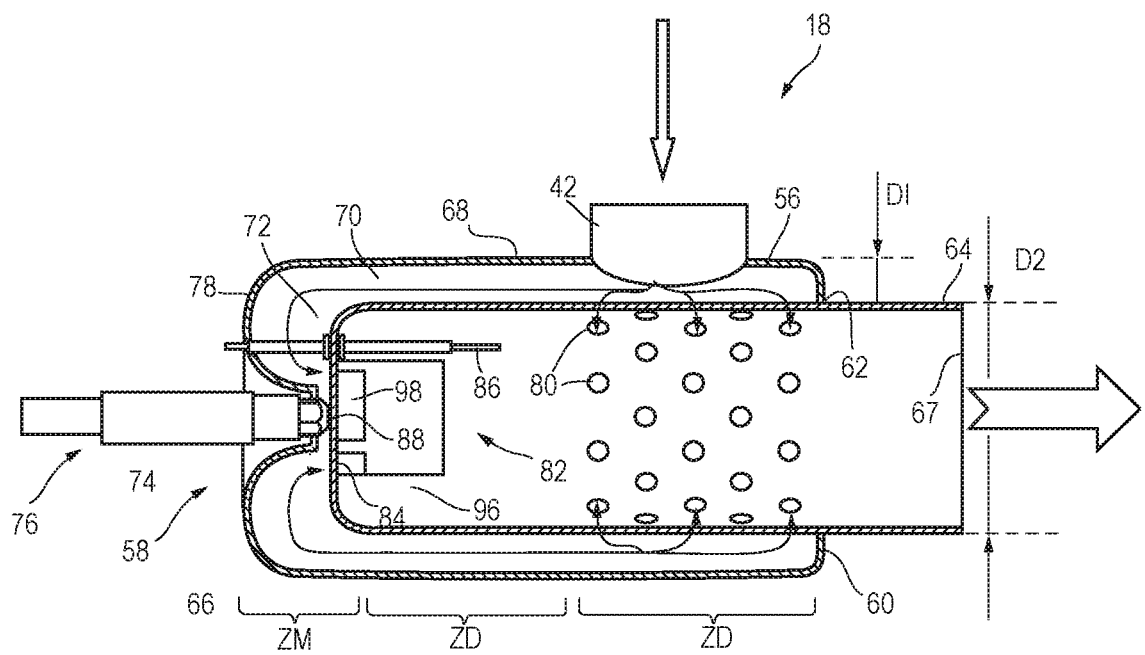
FIG. 2 is an axial sectional view showing the combustion chamber according to the invention.

With reference to FIG. 2, burner 18 comprises an outer casing 56, of cylindrical shape and of diameter D1, closed at one end thereof by an injector holder wall 58 and, at the other end, by an annular wall 60 with an opening 62 of inside diameter D2. This burner further comprises a flame tube 64, also of substantially cylindrical shape, coaxially housed in the casing, of smaller diameter than the casing but of identical diameter to that of opening 62 of annular wall 60. This tube comprises an end closed by a diffusion wall 66 opposite and at a distance from injector holder wall 58, and an open end 67 running through the annular wall while sealingly cooperating with the inside diameter of this annular wall so as to form outlet 44 of this burner.

The casing carries, on the periphery 68 thereof and close to annular wall 60, hot compressed air intake 42 for feeding this air to space 70 formed between the casing and the flame tube, and to space 72 formed between the injector holder wall and the diffusion wall.

As better illustrated in FIG. 2, the injector holder wall comprises a plate 74 through which a means for injecting at least one fuel 76 is mounted, here in form of an injector coaxial to the flame tube. This plate is surrounded by an air deflecting wall 78, semi-toroidal here, whose concavity is directed towards the flame tube and which is connected to periphery 68 of the casing.

The flame tube comprises circumferential rows of radial dilution orifices 80 positioned at a distance from the wall and close to the annular wall of the casing while being advantageously evenly distributed opposite intake 42. This flame tube also comprises a flame stabilizer 82 arranged on diffusion wall 66 and within the tube by being housed in an orifice 84 provided in this diffusion wall.

This flame stabilizer allows to generate burnt gas recirculation zones facilitating ignition of the fuel and locally providing inerts in the reaction zone. It also enables physico-chemical flame stabilization and combustion confinement.

The burner further comprises an ignition device 86 for a fuel mixture. By way of example, this device can be a plug of the type used for spark-ignition internal-combustion engines, a glow plug, ignition electrodes, etc.

In any case, the position of the ignition device should be in a zone of the burner that is not directly exposed to the flame so as to preserve it.

Preferably, as illustrated in FIG. 2, the active end of this ignition device is positioned immediately after the flame stabilizer.

The burner thus made up comprises a flame tube with an injection/mixing zone ZM where mixing of the hot compressed air with the fuel occurs and combustion starts, a primary zone ZP where combustion takes place, a dilution zone ZD where the burnt gases from the primary zone mixes with the hot compressed air from the dilution holes. The main purpose of this dilution zone is to reduce the temperature of the gases at the dilution zone outlet and to allow good spatial homogenization thereof prior to entering the expansion turbine.

Figure 3A:
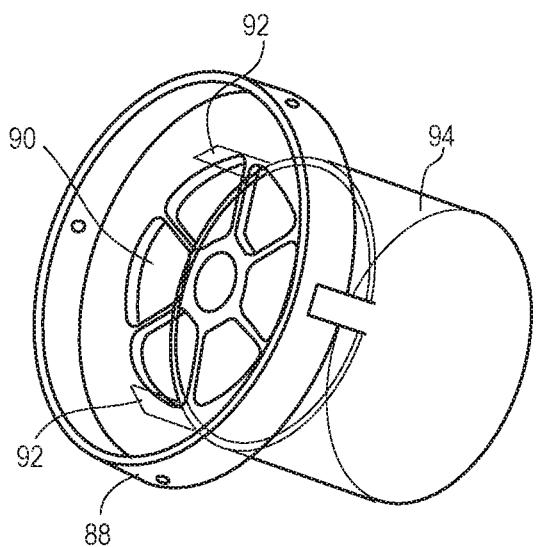
FIG. 3A is a perspective view of an element of the combustion chamber according to the invention with a front view (FIG. 3B) and a sectional view (FIG. 3C)
Figure 3B:
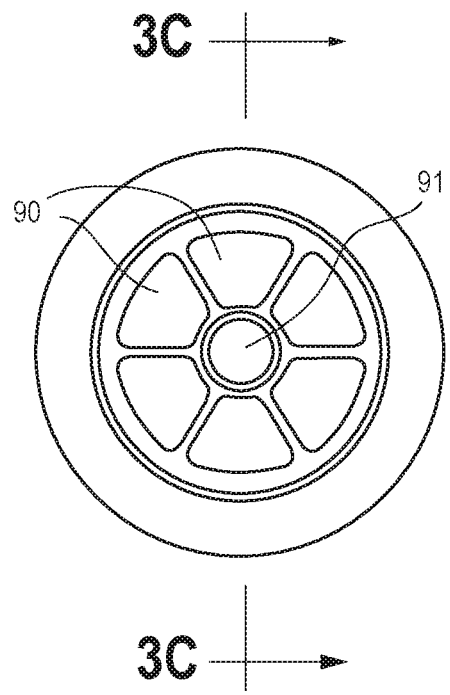
Figure 3C:
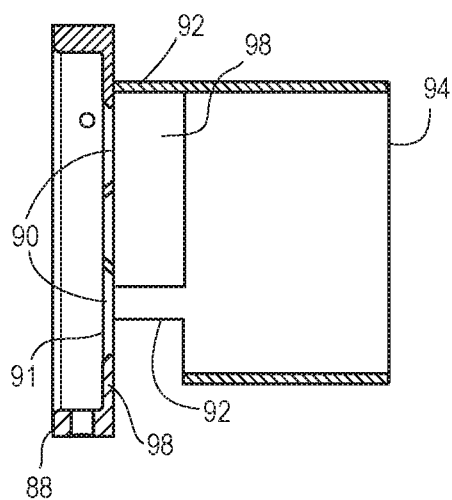

We now additionally refer to FIGS. 3A to 3C, which illustrate an example embodiment of a flame stabilizer.

This stabilizer comprises a perforated diffuser in form of a flat circular soleplate 88 intended to be housed in orifice 84 of diffusion wall 66 and comprising a plurality of axial holes 90 evenly distributed circumferentially over the soleplate and a central axial hole 91. This soleplate is extended in an axial direction and opposite to the wall by axial arms 92, three arms arranged 120° to one another here and carrying at their ends a mixing tube 94 of limited axial extent, thus reaching to the beginning of primary zone ZP, and of outside diameter smaller than the inside diameter of flame tube 64.

A free axial passage 96 is thus provided between the outer periphery of the mixing tube and the inner periphery of the flame tube (see FIG. 2), as well as at least one radial recirculation passage 98, three here, between the soleplate, the mixing tube and the arms.

In operation, the fuel, in liquid form here, is injected through injector 76 towards perforated soleplate 88 so as to flow through central hole 91. The hot compressed air from intake 42 enters space 72 between the walls, it is then deflected by deflection wall 78 in order to flow through holes 90 of the soleplate and it is sent to mixing tube 94 wherein evaporation of the liquid fuel, then combustion takes place.

This stabilizer thus allows to facilitate vaporization of the fuel by sending part of the burnt gases from primary zone ZP, inert and hot, towards the fuel jet coming from the injector through recirculation passages 98 provided between soleplate 88 and mixing tube 94 (dotted arrows in FIG. 2).

Improved fuel vaporization combined with the supply of inert gases in the reaction zone thus allows to obtain low pollutant emissions (NOx, HC, CO and PM).

Of course, the mixing tube needs to be at a distance from the soleplate so that part of the burnt gases from primary zone ZP can be sent to the fuel jet through the space provided between the soleplate and the mixing tube.

The mixing tube may therefore be connected by radial arms to the flame tube instead of being connected to the soleplate.

In the example of FIG. 2, air coming from intake 42 flows countercurrent to the burnt gases of the combustion chamber, but this air may also flow cocurrent to these burnt gases.

A throttling means such as a valve (not shown) may also be provided on air intake 42 to allow the amount of air flowing into the primary zone and the dilution zone to be controlled.

Figure 4:
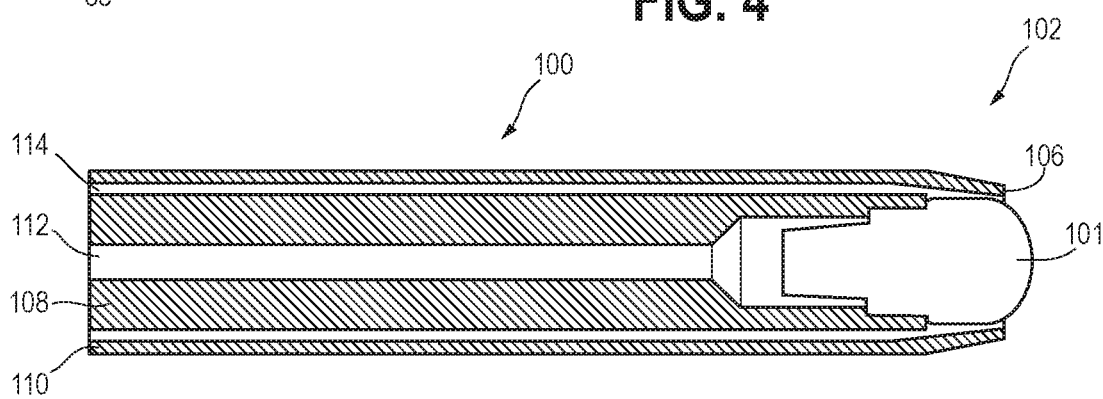
FIG. 4 is a sectional view showing another element of the combustion chamber according to the invention.

FIG. 4 shows a variant of the injector as illustrated for the burner of FIG. 2.

As previously mentioned, the injector can be a multi-fuel gas-liquid injector.

Indeed, for applications where the fuel is selected depending on its nature (gas or liquid), its availability or its cost, the burner injector can be adapted.

The injector therefore comprises a body 100 and an injection head 102 with an injection nozzle 104 for a fuel and another injection nozzle 106 for another fuel.

The body is comprised of two concentric tubes 108, 110 with a central part 108 provided with a passage 112 for injecting a fuel, in liquid form for example, through injection nozzles 104 and with a peripheral passage 114 between the two tubes for injecting a fuel of a different nature (gas) through nozzles 106.

Of course, this injector is associated with a fuel injection circuit having two tanks and the various monitoring and/or control devices for performing injection of one or other of the fuels.

The invention claimed is:

1. A turbine for energy production of electrical energy, comprising:
   at least one compression stage with at least one gas compressor,
   a heat exchanger,
   a combustion chamber supplied with fuel by at least one tank, the combustion chamber comprising a casing housing a flame tube with a perforated diffuser for passage of hot compressed air, a primary zone (ZP) that receives part of the hot compressed air flow and where combustion takes place, a dilution zone (ZD) where burnt gases from the primary zone mix with a remaining part of the hot compressed air flow, and an injector for injecting at least one fuel, wherein flame tube carries a flame stabilizer comprising a perforated diffuser, at least one combustion gas recirculation passage and a mixing tube, wherein the casing comprises a deflection wall comprising a semi-toroidal wall with a concavity directed towards the flame tube for sending the hot compressed air to the flame tube, and
   at least one expansion stage with at least one expansion turbine connected by a shaft to the compressor, and an electric generator arranged on the shaft between the at least one gas compressor and the at least one expansion turbine.

2. The turbine as claimed in claim 1, wherein mixing tube of the perforated diffuser is carried by arms connected to perforated diffuser while being at a distance from the perforated diffuser.

3. The turbine as claimed in claim 1, wherein the recirculation passage is formed between perforated diffuser and mixing tube.

4. The turbine as claimed in claim 1, wherein it comprises a multi-fuel injection means.

5. A turbine for energy production of electrical energy, comprising:
   at least one compression stage with at least one gas compressor,
   a heat exchanger,
   a combustion chamber supplied with fuel by at least one tank, the combustion chamber comprising a casing housing a flame tube with a perforated diffuser for passage of hot compressed air, a primary zone (ZP) that receives part of the hot compressed air flow and where combustion takes place, a dilution zone (ZD) where burnt gases from the primary zone mix with a remaining part of the hot compressed air flow, and an injector for injecting at least one fuel, wherein flame tube carries a flame stabilizer comprising a perforated diffuser, at least one combustion gas recirculation passage and a mixing tube, wherein the mixing tube of the perforated diffuser is carried by arms connected to flame tube while being at a distance from the perforated diffuser, and
   at least one expansion stage with at least one expansion turbine connected by a shaft to the compressor, and an electric generator arranged on the shaft between the at least one gas compressor and the at least one expansion turbine.

* * * * *